(12) United States Patent
Popoola et al.

(10) Patent No.: US 6,523,732 B1
(45) Date of Patent: Feb. 25, 2003

(54) ULTRASONIC WELDING APPARATUS

(75) Inventors: Oludele Olusegun Popoola, Novi, MI (US); Jan Birger Skogsmo, Canton, MI (US); Arnon Wexler, Southfield, MI (US); Larry Van Reatherford, Clarkston, MI (US); Edgar de Vries, Trenton, MI (US); Daniel Edward Wilkosz, Ypsilanti, MI (US)

(73) Assignee: Ford Global Technologies, Inc., Dearborn, MI (US)

( * ) Notice: Subject to any disclaimer, the term of this patent is extended or adjusted under 35 U.S.C. 154(b) by 0 days.

(21) Appl. No.: 09/682,729

(22) Filed: Oct. 10, 2001

(51) Int. Cl.7 .............................. B23K 1/06; B23K 37/00
(52) U.S. Cl. ......................... 228/1.1; 228/4.1; 228/44.3; 228/54; 228/110.1
(58) Field of Search .................. 228/1.1, 4.1, 6.1, 228/6.2, 4.5, 54, 44.3, 110.1

(56) References Cited

U.S. PATENT DOCUMENTS

| | | | |
|---|---|---|---|
| 3,291,957 A | 12/1966 | Bodine | |
| 3,438,428 A | 4/1969 | Balamuth et al. | |
| 3,529,660 A | 9/1970 | Obeda | |
| 3,765,589 A * | 10/1973 | Walraven et al. | 228/1.1 |
| 3,908,886 A * | 9/1975 | Raske | 228/1.1 |
| 4,194,937 A | 3/1980 | Hashmall | |
| 4,444,614 A * | 4/1984 | Krayer | 156/580.2 |
| 4,527,727 A | 7/1985 | Renshaw | |
| 4,529,115 A | 7/1985 | Renshaw et al. | |
| 4,545,519 A | 10/1985 | Renshaw et al. | |
| 4,572,753 A | 2/1986 | Bach | |
| 4,647,325 A | 3/1987 | Bach | |
| 4,798,639 A | 1/1989 | Yamaguchi | |
| 5,029,746 A * | 7/1991 | Altpeter et al. | 228/1.1 |
| 5,147,082 A | 9/1992 | Krause et al. | |
| 5,238,170 A * | 8/1993 | Nuss | 228/1.1 |
| 5,575,884 A | 11/1996 | Annehed et al. | |
| 5,651,494 A | 7/1997 | Ogino et al. | |
| 5,709,823 A | 1/1998 | Hahn | |
| 5,782,575 A | 7/1998 | Vincent et al. | |
| 5,785,786 A | 7/1998 | Suzuki et al. | |
| 5,800,672 A | 9/1998 | Boyce et al. | |
| 5,921,457 A | 7/1999 | Patrikios | |
| 6,089,438 A | 7/2000 | Suzuki et al. | |
| 6,099,364 A | 8/2000 | Shinchi | |
| 6,148,515 A | 11/2000 | Suzuki et al. | |
| 6,176,953 B1 | 1/2001 | Landreth et al. | |
| 6,202,915 B1 | 3/2001 | Sato | |
| 6,238,503 B1 | 5/2001 | Kakehi | |
| 6,450,393 B1 * | 9/2002 | Doumanidis et al. | 228/110.1 |

FOREIGN PATENT DOCUMENTS

JP            10244381            9/1998

* cited by examiner

*Primary Examiner*—Tom Dunn
*Assistant Examiner*—Zidia Pittman
(74) *Attorney, Agent, or Firm*—Raymond L. Coppiellie

(57) ABSTRACT

An apparatus for ultrasonically welding workpieces that reduces sonotrode adhesion during the ultrasonic welding process. The sonotrode tip has a specific surface configuration, including a curvilinear shaped outer surface combined with a plurality of grooves and lands. Due to the curvilinear surface, the depth of the grooves gradually decreases near the outer edge or periphery of a contact surface of the sonotrode tip. Further, such a groove and land combination also provides a sharp edge or corner that reduces sliding of the tip on the workpiece and correspondingly reduces sticking. In addition, various types of coatings or inserts may also be used to reduce sticking of the sonotrode tip to the workpiece.

20 Claims, 5 Drawing Sheets

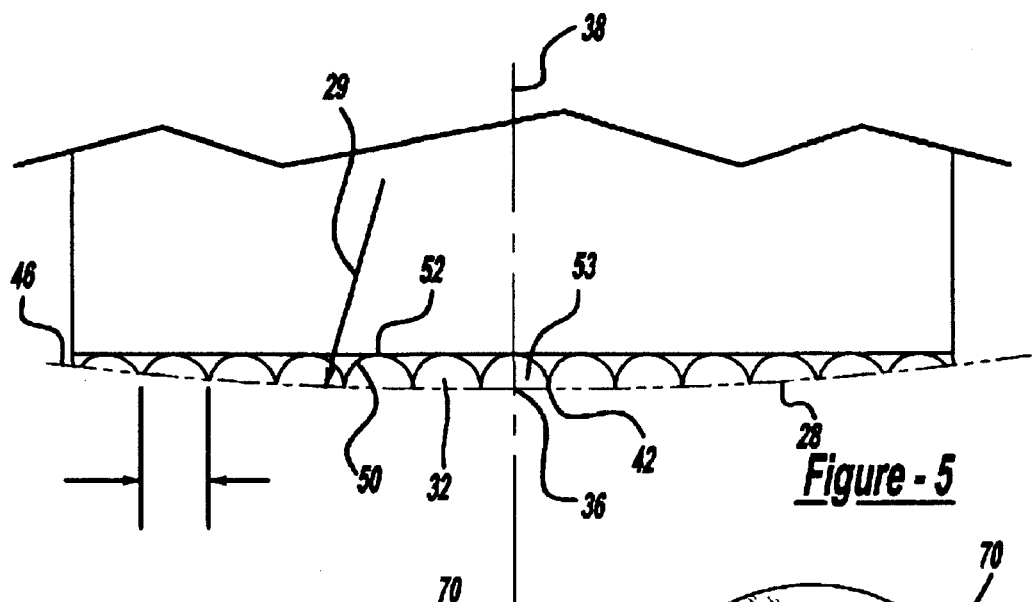
*Figure - 5*
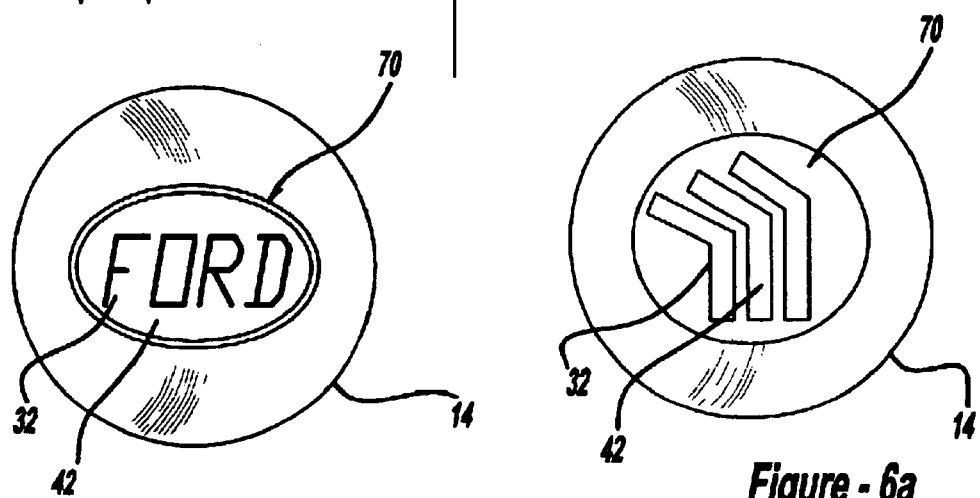
*Figure - 6*  *Figure - 6a*
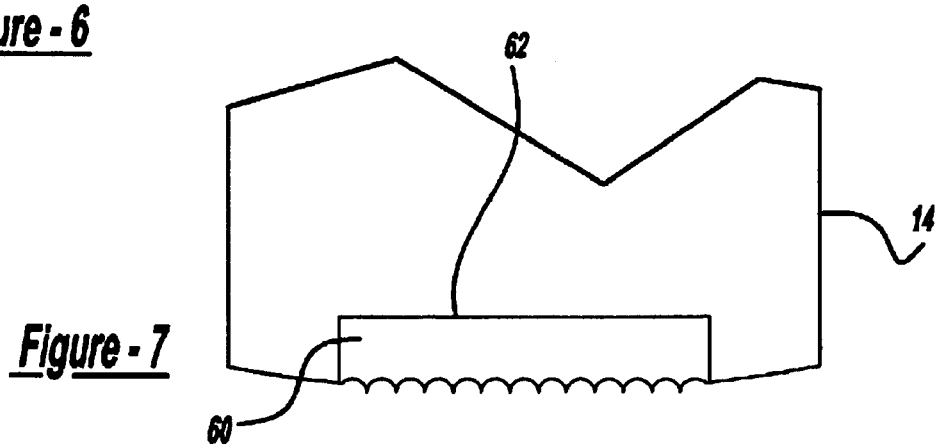
*Figure - 7*

ULTRASONIC WELDING APPARATUS

BACKGROUND OF INVENTION

The present invention relates generally to ultrasonic welding and, more specifically, to an ultrasonic welding apparatus that reduces sonotrode adhesion during the ultrasonic welding process.

Ultrasonic welding of various materials is known. The process involves vibrating adjacent workpieces clamped between a sonotrode and an anvil. Frictional forces occurring between the vibrating workpieces create a bond or weld that occurs at the interface of the adjacent workpieces. Accordingly, various sonotrode and anvil surface configurations, i.e., the surface that contacts the workpieces, are known and used to transfer energy from the sonotrode to the interface of adjacent workpieces. Such configurations attempt to reduce the energy loss at the sonotrode/workpiece interface or the anvil/workpiece interface thereby increasing the energy to the workpiece/workpiece interface and increasing the overall efficiency of the ultrasonic welding apparatus.

Further, it is known that when using an ultrasonic welding apparatus to weld metals, specifically aluminum, the sonotrode or more specifically, the sonotrode tip may stick to the workpiece being welded. The adhesion can be so severe as to damage the weld when detaching the sonotrode from the joined workpieces. Sticking or adhering to the workpiece generally results from the sonotrode sliding on the workpiece. When the sonotrode slides, it causes galling or a buildup of material on the sonotrode tip.

Thus, each time the sonotrode performs a weld, a small amount of aluminum adheres to the sonotrode tip. Continued welding operations result in aluminum build up on the tip. The built up aluminum on the tip bonds with the material of the workpiece. When this occurs, the tip sticks to, or in short, becomes welded to the workpiece. Additionally, as aluminum builds up on the tip, it clogs the gripping surface of the tip and reduces the efficiency of the ultrasonic welding apparatus as energy normally transferred to the workpiece to perform the weld remains at the tip/workpiece interface.

Therefore, there is a need in the art to provide an ultrasonic welding apparatus designed such that it reduces aluminum/sonotrode adhesion during the ultrasonic welding process while promoting energy transfer to the interface of adjacent workpieces.

SUMMARY OF INVENTION

Accordingly, the present invention is an ultrasonic welding apparatus. configured such that it reduces adhesion between the welding apparatus and the workpiece during the ultrasonic welding process. In one embodiment thereof, the apparatus includes an arcuate shaped sonotrode tip. The sonotrode tip has a plurality of grooves formed therein. The grooves extend perpendicular to the direction of sonotrode vibration. The length and depth of each groove depends in part upon the curvature of the sonotrode tip surface. The sonotrode tip also includes a plurality of lands formed adjacent to the grooves.

In accordance with a further embodiment of the invention, a surface treatment is provided on the sonotrode tip to reduce adhesion of the tip to the workpiece. The surface treatment may include an insert formed of a stick-resistant material placed on the sonotrode tip.

In accordance with a further embodiment, rotation of the anvil of the ultrasonic welding apparatus after the weld is completed operates to release the workpiece from the ultrasonic welding apparatus. Rotation of the anvil may be combined with the use of a sonotrode tip having reduced adhesion properties such that any sticking occurs at the anvil/workpiece interface rather than the sonotrode/workpiece interface.

Accordingly, the ultrasonic welding apparatus operates to reduce or control sticking of the sonotrode to the material or workpiece while having suitable gripping ability to transfer energy from the sonotrode to the workpiece to perform the ultrasonic welding process.

BRIEF DESCRIPTION OF DRAWINGS

FIG. 5 is a side view of an alternative embodiment of a sonotrode tip used with an ultrasonic welding apparatus according to the present invention.

FIG. 6 is a bottom view of a second alternative embodiment of a sonotrode tip used with an ultrasonic welding apparatus according to the present invention.

FIG. 6a is a bottom view of a third alternative embodiment of a sonotrode tip used with an ultrasonic welding apparatus according to the present invention.

FIG. 7 is a side view of a third alternative embodiment of a sonotrode tip used with an ultrasonic welding apparatus according to the present invention.

DETAILED DESCRIPTION

Figure 1:
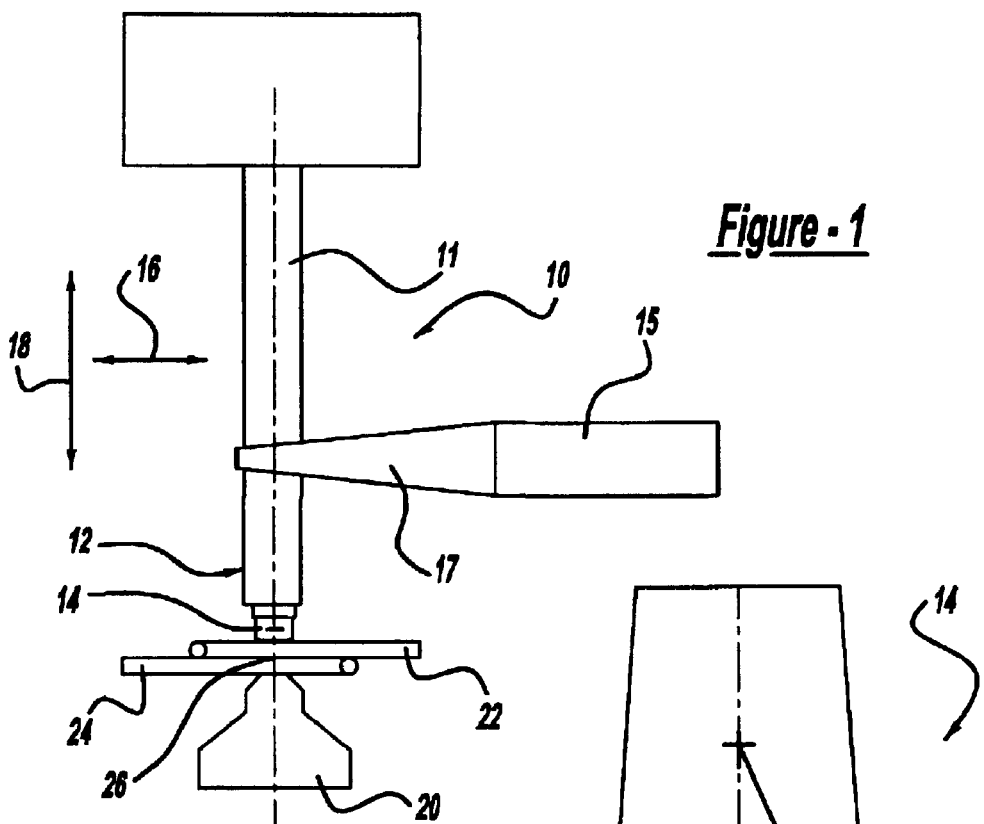
FIG. 1 is a schematic view of an ultrasonic welding apparatus.

FIG. 1 shows an ultrasonic welding apparatus, seen generally at 10, according to the present invention. The ultrasonic welding apparatus 10 includes a reed 11 and a sonotrode 12 mounted for movement in a side-to-side or horizontal direction of vibration, shown by the arrow 16. The reed 11 and sonotrode 12 also moves in a vertical manner, shown by the arrow 18, and in cooperation with an anvil 20 clamps the first 22 and second 24 workpieces in position. Once the workpieces 22, 24 are clamped, a transducer 15 operates through a wedge 17 to transfer high frequency vibrations from the transducer to the reed 11 to impart energy to the first 22 and second 24 workpieces at a location between the sonotrode 12 and the anvil 20 to create a bond or weld at the interface or adjacent surfaces 26 of the workpieces 22, 24 in accordance with known ultrasonic welding processes. The term sonotrode 12 used herein refers generally to the reed 11 and sonotrode 12 combination as the sonotrode 12 is typically the gripping tool attached to the reed 11.

Figure 2:
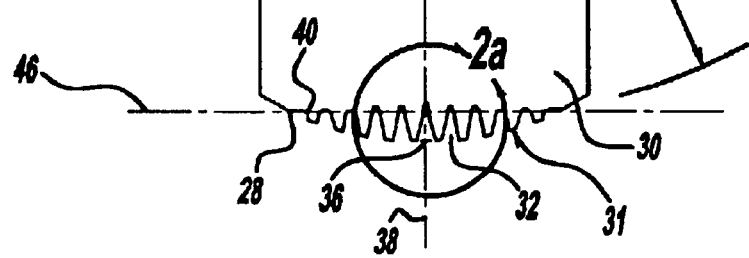
FIG. 2 is a side view of a sonotrode tip according to the present invention for use with an ultrasonic welding apparatus.

The sonotrode 12 includes a sonotrode tip 14. As shown in FIG. 2, the sonotrode tip 14 has a spherical outer surface 28 on the distal end 30 thereof. A plurality of grooves 32 are formed in the spherical outer surface 28 and cooperate with a portion of the spherical outer surface 28 to form a contact surface 31. The size or area of the contact surface 31 may vary to pending upon the particular material to be welded. The contact surface 31 may be as large as the entire spherical outer surface 28 or it may be limited to the area encompassing the grooves 32. The grooves 32 extend inward from the spherical outer surface 28 to a common reference plane 46. Accordingly, the deepest groove 32 is that one coincident with the high point or apex 36 of the spherical outer surface 28. The high point or apex 36 is located on the longitudinal axis 38 of the sonotrode 12. The spherical outer surface 28 drops off or away the greater the distance from the center point or apex 36. As the grooves 32 each extend to a common reference plane 46 they fade out on the spherical outer surface 28 the farther they are from the high point or apex 36. In the preferred embodiment, the point at which the grooves 32 fade out defines the peripheral edge 40 of the contact surface 31. Since the grooves 32 gradually fade out at the peripheral edge 40, the welding stresses at the peripheral edge 40 are less and, therefore, the weld is less likely to crack at the edges.

Figure 2A:
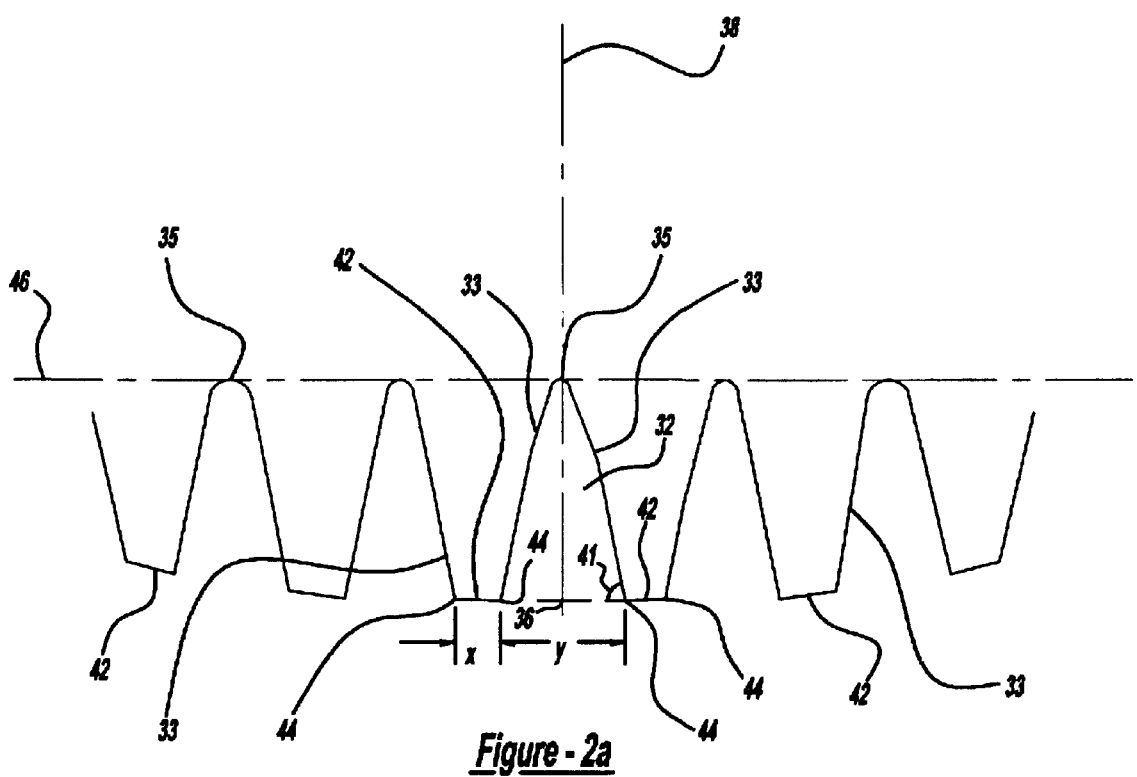
FIG. 2a is an enlarged view of the sonotrode tip according to the present invention for use with an ultrasonic welding apparatus.
Figure 3:
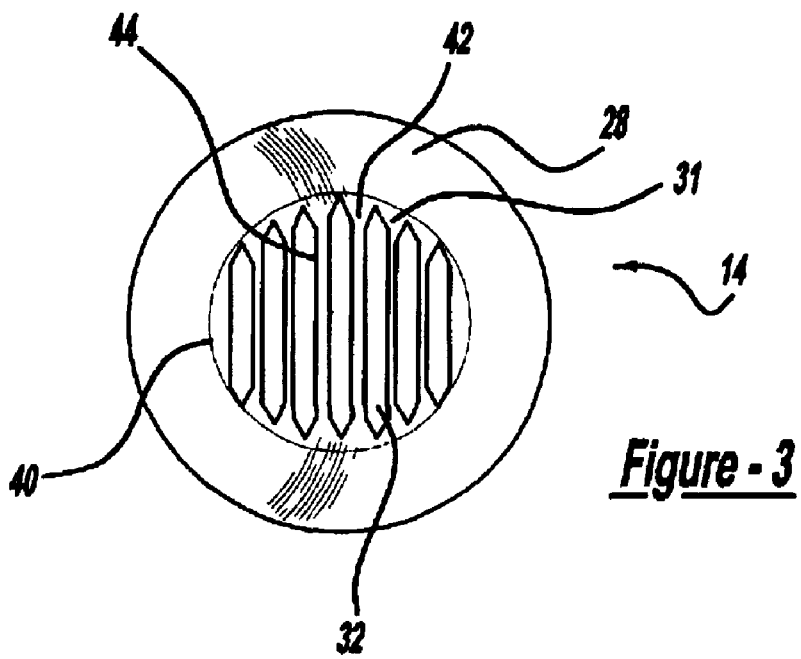
FIG. 3 is a bottom view of the sonotrode tip according to the present invention of FIG. 2.
Figure 4:
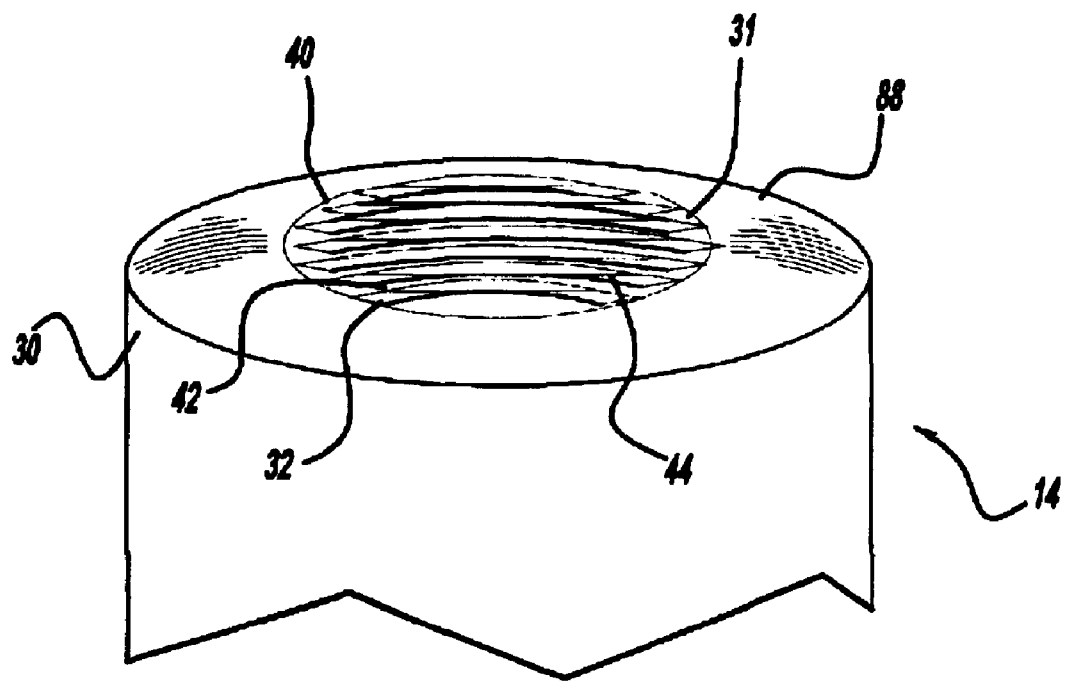
FIG. 4 is a perspective view of the end of the sonotrode tip according to the present invention.

Turning to FIG. 2a, the grooves 32 are shown arranged in a row pattern. Wherein the bottom or lower portion 35 of the grooves 32 extends to a reference plane 46. It is the position of the reference plane 46 that establishes the bottom of the grooves 32 irrespective of their location on the outer surface 28. As shown, the groove 32 includes sidewalls 33 extending at an angle 41 of approximately 60 degrees. Accordingly, the sidewalls 33 extend from the bottom or lower portion 35 of the grooves 32, which are rounded to a land area 42. In the specific embodiment, for use in ultrasonically welding an aluminum workpiece, the depth of the reference plane 46 is 0.011 inches when taken from the apex 36. The groove depth is a function of the thickness of the material to be welded. For instance, the ratio of the depth of the groove 32 to the thickness of the material is roughly 0.01 to 0.04.

In addition, the depth of the grooves 32 will vary along the outer surface 28 as the radius of the outer surface 28 varies. For instance, the invention contemplates the use of a spherical radius 29 of 0.5 inches to 4 inches. Accordingly, the area of the outer spherical surface 28 having grooves 32 is determined by the depth of the reference plane 46 at the apex 36 and the radius of curvature 29 of the spherical outer surface 28.

FIG. 2a further shows an embodiment of the invention wherein the grooves 32, at the apex 36, have a width (y) of 0.025 inches and a space or area between the grooves 32, defined as a land 42, having a width (x) of 0.011 inches. The width (x) of the land 42 is less than the width (y) of the grooves 32. The respective widths may be expressed as a ratio, wherein the ratio of the width (x) of the land 42 to the width (y) of the groove is roughly 0.4 to 0.8. Having a land 42 width (x) less than the width (y) of the groove 32 allows to the land 42 to press into the workpiece 22.

As shown, the land/groove intersection defines a sharp and discrete edge or corner 44 that aids in gripping the workpiece 22. It should be understood the above dimensions are intended as an example only and depending upon the various parameters such as workpiece type their dimensions may change. Further, as the size or width of the land 42 increases, the sonotrode tip 14 sits on and slides back and forth on the surface of the workpiece 22. Thus, in most instances, it is advisable to keep the width of the land 42 less than that of the grooves 32. Although, in some instances, the respective widths can be varied along the contact surface 31.

It should be understood all of the grooves 32 are cut or ground to the reference plane 46, see FIGS. 2 and 2a.

Specifically, the rounded bottom 35 of each groove 32 lies in or adjacent the same plane 46. Accordingly, while the centermost groove 32 has the maximum depth with respect to the outer surface 28, corresponding adjacent grooves 32 decrease in depth as the spherical outer surface 28 of the sonotrode tip 14 falls inward toward the plane defined by the bottom of the grooves 32. As shown in FIGS. 2 and 2a, the depth of the groove 32 farthest from the apex 36 is less, when measured from the spherical outer surface 28 than the groove 32 located at the apex 36. Thus, the groove depth 34 fades out or decreases the closer to the periphery 40 of the contact surface 31 wherein the contact surface 31 is that portion of the spherical outer surface 28 that falls or extends underneath the plane 46 shown in FIG. 2.

Other configurations of grooves 32 are also suitable for use with the present invention. As shown in FIG. 5, the grooves 32 may be formed with a semi-circular cross-section 50. Each groove 32 is situated immediately adjacent the next groove 32. Again, the grooves 32 are all cut in the same plane 46 wherein the bottom 52 of each groove 32 lies in the same plane 46. Once again, due to the arcuate or curved surface of the sonotrode tip 14, the depth 53 of the groove 32 varies depending on the distance from the apex 36, with the depth decreasing the greater the distance from the apex 36 of the curved or spherical outer surface 28. Further, as the grooves 32 are positioned adjacent one another, the thickness of the lands 42 at the very center of the sonotrode tip 14, i.e., near, the apex 36 is small. Correspondingly, the thickness of the lands 42 increases the further the location from the apex 36.

Additionally, as shown in FIGS. 6 and 6a, it is contemplated that a word or term 70, a logo or specific design 72 or a part or vehicle identification number may be formed in the sonotrode tip 14 such that the sonotrode tip 14 imprints the logo or design as part of the weld on the workpiece surface. In the case of the vehicle identification number, printing the number on various parts of the vehicle may aid in identification of the vehicle if the vehicle is ever lost or stolen. With such embodiments, the logo or design is engraved on the sonotrode tip 14. Depending upon the specific logo design, it may be necessary to form the sonotrode tip with different curvatures other than one having a spherical surface as set forth above. The logo 70 is formed by a combination of the grooves 32 and the lands 42. It should be understood that the sonotrode tip 14 is oriented in a direction such that the majority of the lands 42 and grooves 32 or, ridges and relief portions of the logo 70 are placed in a direction transverse the direction of vibration of the sonotrode 12. Once again, the corner or edge defined by the intersection of the lands 42 and grooves 32 or the ridges and relief portion forming the logo 70 should be relatively sharp or angular to ensure proper engagement between the sonotrode tip 14 and workpiece 22 and correspondingly reduce sliding on the workpiece 22 which, as set forth above, increases the likelihood of the sonotrode tip 14 sticking to the workpiece 22.

In a further embodiment, the sonotrode tip 14 may include a coating or be formed of a material that has physical properties that reduce its propensity to stick to the workpiece. For instance, the sonotrode tip 14, typically formed of a M2 tool steel, may instead be formed of a T1 tool steel, which has a high concentration of tungsten. The increased tungsten content in the sonotrode tip 14 results in a tip that is less likely to adhere to an aluminum workpiece. Further, a tungsten coating may also be applied to the sonotrode tip 14. The coating should have good adherence properties along with an ability to withstand the applied pressure and ultrasonic vibrations without cracking and peeling. Various types of surface treatments or coatings that could be used include, but are not limited to, physical vapor deposited (PVD) coatings of TiN, TiCN, Ti AlN, WC/C CrC, CRN or combinations thereof. In addition, chemical vapor deposited (CVD) coatings of similar types may be used. In addition, electroplated or electroless coatings like chromium or nickel can be used. Finally a surface modification or diffusion process like a plasma nitriding process, a tungsten implanting process or plasma immersion ion process can be used to implant various materials such as tungsten or chromium.

The sonotrode tip 14 may also utilize an insert 60, such as shown in FIG. 7. In such an embodiment, a notch 62 is cut in the sonotrode tip 14 and an insert 60, typically formed of a tungsten material as set forth above, is secured within the notch 62. The insert may also a formed of a hydrate material, i.e., one that has water contained therein such as bohemite, or aluminum oxide, $Al_2O_3 \cdot n H2O$ that, when heated, loses or emits the water or moisture contained therein. Accordingly, since the temperature of the sonotrode tip 14 rises during the ultrasonic welding process, some of the water or moisture contained in the insert is released. Absorption from the atmosphere replenishes the consumed or applied water between welds. Such a hydrated material may also be applied as a surface layer, e.g., a hydrated oxide. It should be understood that applying water or some other liquid between the sonotrode tip 14 and the workpiece 22 decreases the likelihood that the sonotrode tip 14 will stick to the workpiece 22. While the insert 60 shown in the preferred embodiment includes grooves, the insert 60 may also utilize a standard knurled pattern or any other pattern found to suitably grip the workpiece during the ultrasonic welding procedure.

Figure 8:
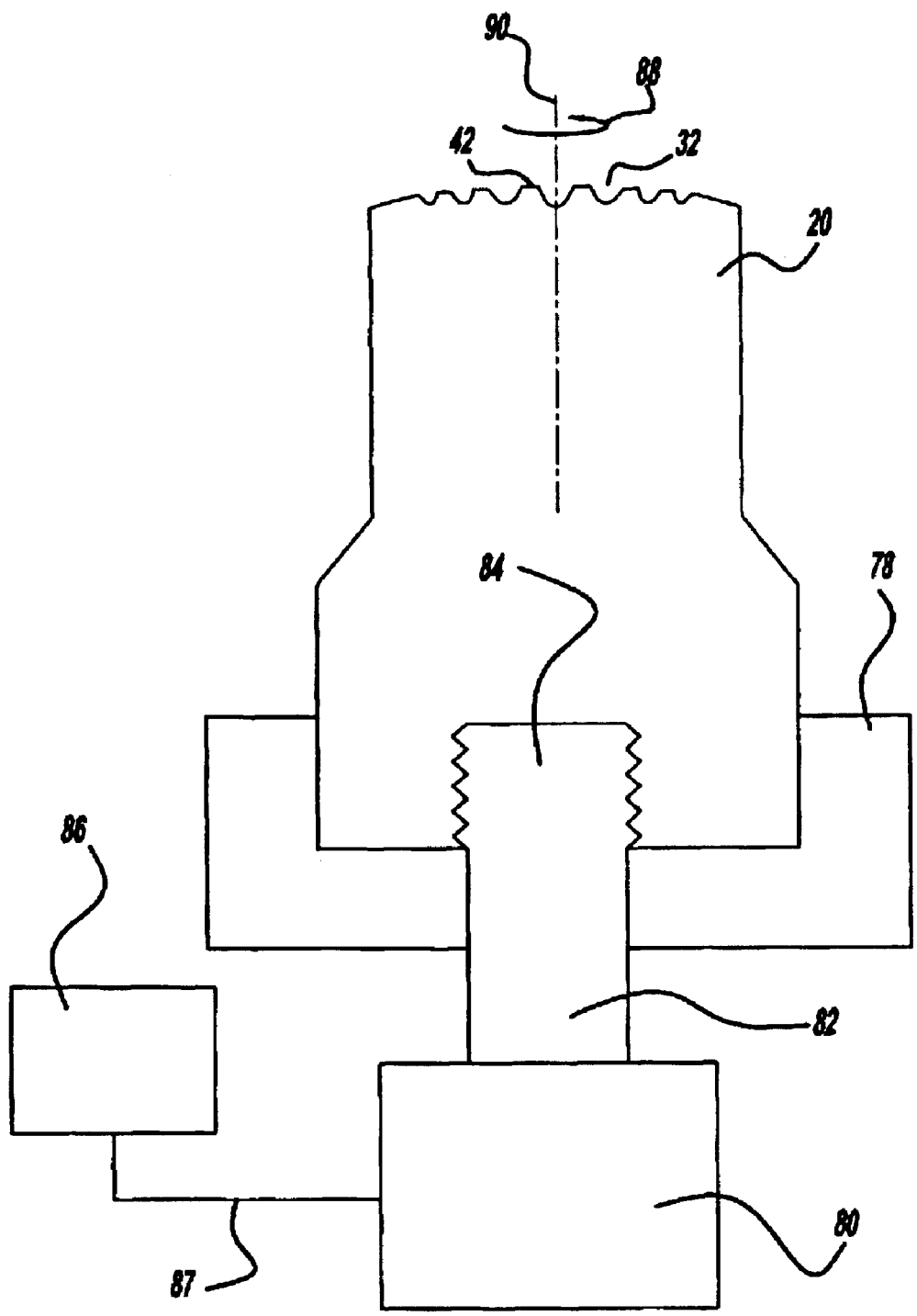
FIG. 8 is a side view of an apparatus for rotating an anvil for use with an ultrasonic welding apparatus according to the present invention.

Finally, an alternative embodiment includes a rotatable anvil feature that, in the preferred embodiment, operates in connection with a non-stick sonotrode tip 14. As shown in FIG. 8, the anvil 20 is rotatably supported in a base member 78. A motor 80 drives a shaft member 82 having one end 84 thereof connected the anvil 20. As shown, a control member and 86 sends a signal through a control line 87 to energize the motor 80 and rotate the anvil 20 in the direction 88 about an axis 90 perpendicular to the plane of the lower workpiece 24. It should be understood that other mechanisms capable of rotating the anvil 20 might also be used. The main thrust being the use of a rotational motion to dislodge the anvil 20 from the workpiece 24 rather than an axial or pulling motion.

As set forth above, the anvil 20 may include a groove or pattern configuration similar to that of the sonotrode tip 14 set forth above or it may utilize a traditional knurl pattern. If the anvil 20 utilizes a groove 32 and land 42 pattern such as that used on the sonotrode tip 14 then it is advisable to linearly offset the respective groove 32 and land 42 pattern of the sonotrode tip 14 and anvil 20 by 15 to 20 degrees. For instance, while the grooves of the respective sonotrode tip 14 and anvil 20 remain perpendicular to the direction of vibration and parallel to one another, they are offset such that the corresponding grooves and lands are not immediately opposite one another.

Using the sonotrode tip 14 reduces the likelihood that the workpiece 22 will stick to the sonotrode tip 14. Accordingly, by manipulating the surfaces of the respective sonotrode tip 14 and anvil 20, it is possible to control any sticking such that the workpiece 24 sticks after the bonding or welding process at the workpiece/anvil interface. Accordingly, if the anvil 20 sticks to the workpiece, rotation of the anvil 20 in the plane of the workpiece 24 will free the workpiece 24 from the anvil. If used, the knurled or diamond shape surface of the anvil 20 acts as a cam surface that, when rotated, operates to drive or lift the workpiece 24 from the knurled surface.

The present invention has been described in and illustrated manner. It is to be understood that the terminology that has been used is intended to be in the nature of words of description rather than of limitation.

Many modifications and variations of the present invention are possible in light of the above teachings. Therefore, within the scope of the appended claims, the present invention may be practiced other than has specifically described.

What is claimed is:

1. An ultrasonic welding apparatus for bonding workpieces together using a sonotrode and an anvil comprising:

a tip attached to the sonotrode, said tip including a plurality of grooves formed in an outer surface thereof; said outer surface having a curvilinear shape and cooperating with said grooves to define a contact surface wherein the plurality of grooves formed in said outer surface gradually decrease in depth as they near the periphery of the contact surface.

2. An ultrasonic welding apparatus as set forth in claim 1 wherein said grooves are oriented perpendicular to a direction of vibration of the sonotrode.

3. An ultrasonic welding apparatus as set forth in claim 1 including lands positioned adjacent said grooves wherein said grooves are wider than said lands positioned adjacent said grooves.

4. An ultrasonic welding apparatus as set forth in claim 1 wherein said grooves vary in length in a direction perpendicular to a direction of vibration of the sonotrode.

5. An ultrasonic welding apparatus as set forth in claim 3 wherein said grooves and said lands adjacent thereto intersect at a sharp and angular corner.

6. An ultrasonic welding apparatus as set forth in claim 1 wherein the anvil includes a pattern of grooves similar to that of said tip wherein said pattern on said anvil is offset from said pattern of said tip by an angle between fifteen and twenty degrees.

7. An ultrasonic welding apparatus for bonding workpieces using a sonotrode and an anvil:

a tip attached to the sonotrode, said tip having a convex outer surface;

a plurality of grooves formed in said outer surface, said grooves extending perpendicular to a direction of sonotrode vibration, wherein said grooves vary in length depending upon the location of said grooves on said outer surface.

8. An ultrasonic welding apparatus as set forth in claim 7 wherein the width of said grooves varies depending upon the location of said grooves on said outer surface.

9. An ultrasonic welding apparatus as set forth in claim 7 wherein said grooves have a semicircular shaped cross-section.

10. An ultrasonic welding apparatus as set forth in claim 7 wherein said tip includes a coating on the outer surface thereof, said coating formed of a material that reduces the propensity of the tip to stick to the workpiece.

11. An ultrasonic welding apparatus as set forth in claim 10 wherein said coating is a material selected from the group comprising of TiN, TiCN, TiAlN, WC/C, CrC, CRN, chromium, tungsten or any combination thereof.

12. An ultrasonic welding apparatus as set forth in claim 10 wherein said anvil is rotatably mounted on a support member; and a shaft member connected to said anvil on one end thereof and connected to a motor on the opposite end thereof, said motor operative to rotate said anvil about an axis perpendicular to a contact surface of said anvil.

13. An ultrasonic welding apparatus as set forth in claim 12 wherein said anvil includes a knurled surface that engages one of the workpieces.

14. An ultrasonic welding apparatus as set forth in claim 10 wherein both said tip and said anvil have a coating on the outer surface thereof.

15. An ultrasonic welding apparatus as set forth in claim 7 wherein said tip includes an insert, said insert formed of a tungsten material that reduces sticking of said tip to said workpieces.

16. An ultrasonic welding apparatus as set forth in claim 7 wherein said tip includes an insert formed of a hydrate material that releases moisture.

17. An ultrasonic welding apparatus as set forth in claim 7 wherein said grooves are oriented such that they form a logo or design.

18. An ultrasonic welding apparatus for bonding metal workpieces using a sonotrode and an anvil comprising:

a tip fixed to one end of said sonotrode, said tip having a contact surface, said contact surface operative to contact one of said workpieces;

said contact surface including a plurality of grooves located thereon, such grooves extending perpendicular to a direction of vibration of said sonotrode;

said grooves defining a plurality of lands adjacent said grooves;

said grooves further including opposite sidewalls, said sidewalls extending from a bottom of said grooves, said sidewalls intersecting with the adjacent land located on the outer surface of said sonotrode tip and forming a sharp edge.

19. An ultrasonic welding apparatus as set forth in claim 18 wherein the width of the groove is greater than the width of the adjacent land.

20. An ultrasonic welding apparatus as set forth in claim 18 wherein the bottom of each groove is located in a common plane and said contact surface being a curvilinear surface such that the curvature of the contact surface of the sonotrode tip varies the depth of each groove.

* * * * *